E. Luther,
Revolving Rake.
2 Sheets. Sheet 1.
No. 82855.
Patented Oct. 6. 1868.
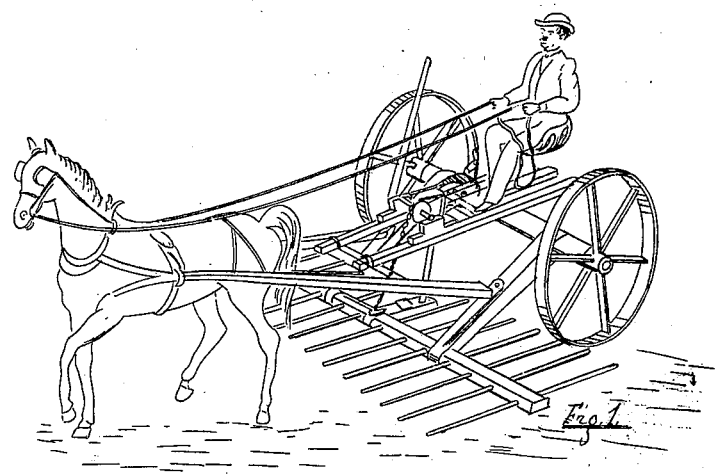
Fig. 1.
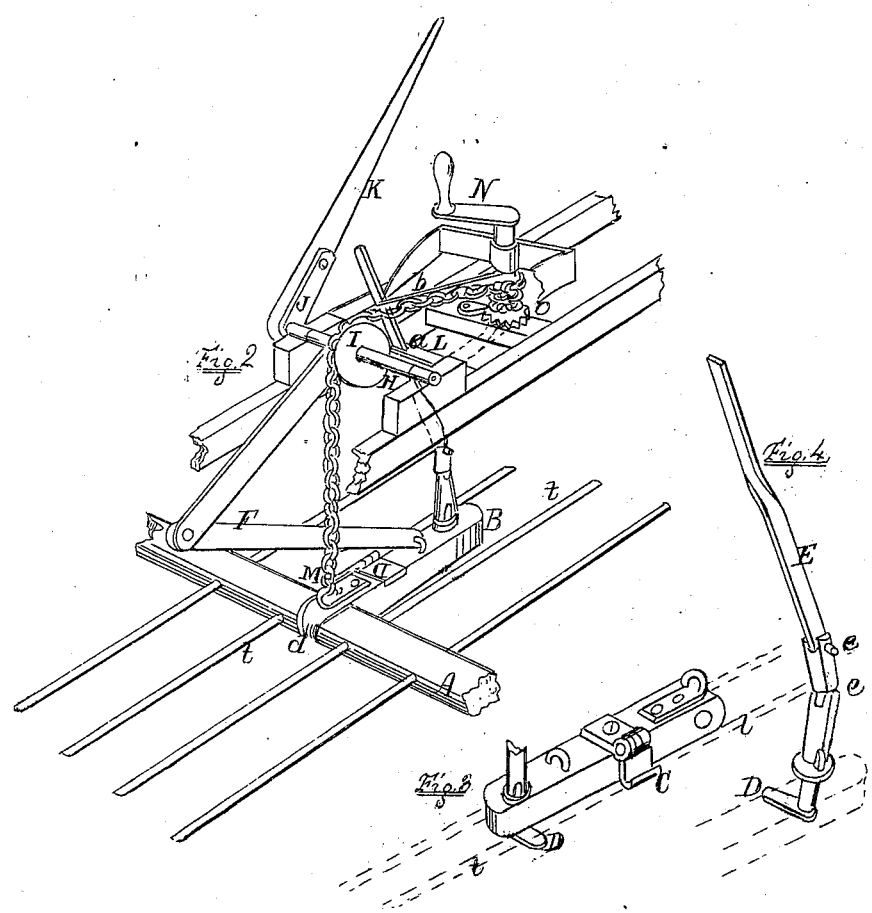

2 Sheets. Sheet. 2.

E. Luther,
Revolving Rake.

No. 82,855. Patented. Oct. 6. 1868.

Witnesses.
E. Cowen
James Forsyth

Inventor.
Ellis Luther

United States Patent Office.

ELLIS LUTHER, OF WEST TROY, NEW YORK.

*Letters Patent No. 82,855, dated October 6, 1868.*

IMPROVEMENT IN HORSE-RAKES.

*The Schedule referred to in these Letters Patent and making part of the same.*

TO ALL WHOM IT MAY CONCERN:

Be it known that I, ELLIS LUTHER, of West Troy, in the county of Albany, and State of New York, have invented a new and useful Improvement in Horse-Rakes; and I do hereby declare that the following is a full, clear, and exact description of the construction and operation of the same, reference being had to the annexed drawings, making a part of this specification, in which—

Figure 1:
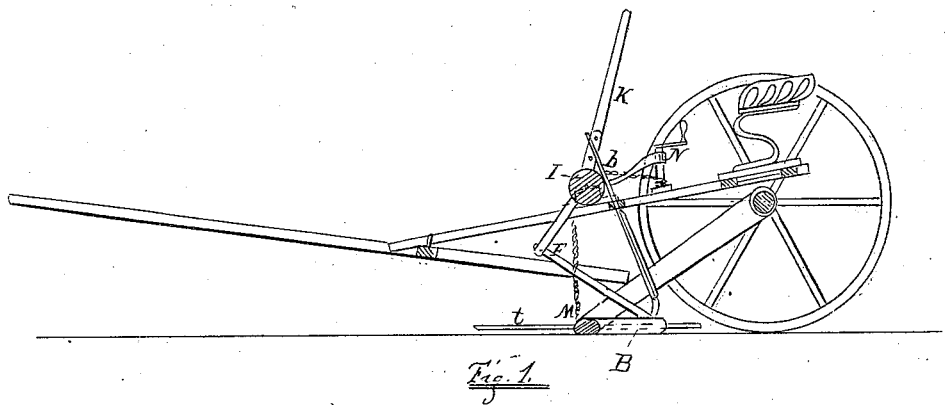

Figure 1, sheet 1, is a perspective view.

Figure 2:
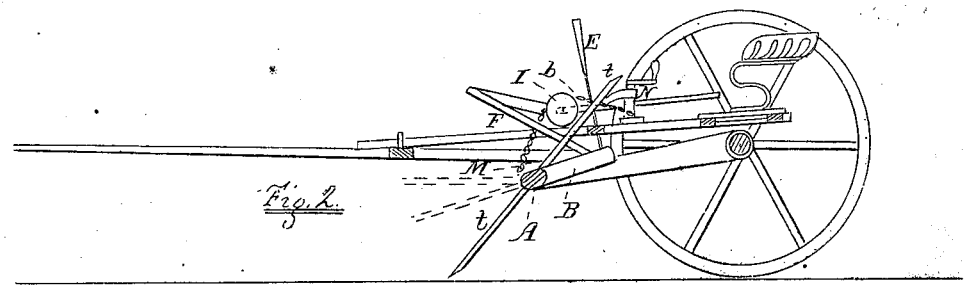

Figure 2, sheet 1, a view of those portions of the machine which constitute my invention.

Figure 1, sheet 2, is a transverse section, showing the position of the machine when gathering the hay.

Figure 3:
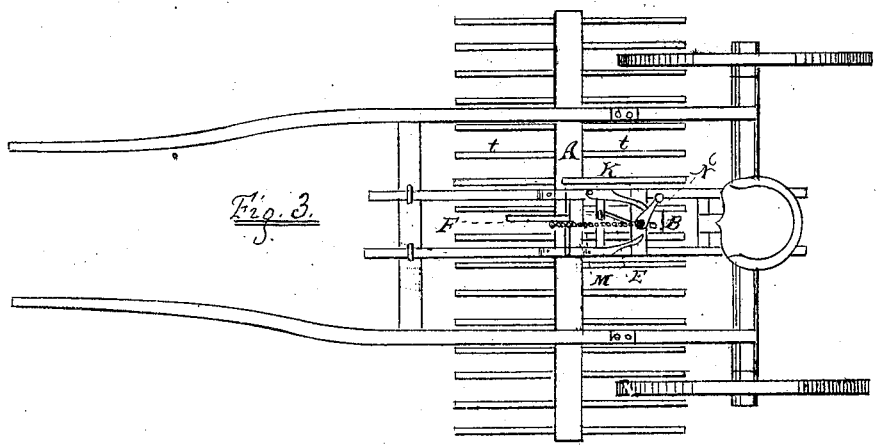

Figure 2, sheet 2, is another transverse section, showing the said machine in the act of making a revolution to discharge the hay; and Figure 3, sheet 2, is a view of the machine from above.

Figures 3 and 4, sheet 1, represent detached portions of my said invention.

My invention relates to that species of rake which is attached to an axle mounted upon two wheels, and consists in a novel and improved mode of causing the rake to revolve and discharge its load without entangling the hay, or winding it around the head of the rake, and also in a novel mode of raising the rake off the ground, and supporting the same when it is about to be transported from place to place.

To enable others skilled in the art to which it relates to make and use my invention, I will proceed to describe its construction and operation.

A is the head of a rake, to which my invention is applied.

B is a block, of wood or other suitable material, at one end of which is a band, $d$, which passes loosely around the head of the rake. This block is attached to the rake-head at or near and behind the centre thereof.

Attached to one side of this block is a wide hook, C, which holds one of the teeth, $t$, of the rake.

When the rake is in its usual position for gathering the hay, it is kept from revolving by the pressure of the foot D, which is attached to a kind of a screw-bar, E.

The upper portion of this screw-bar passes through the aperture, $a$, of the transverse bar L, and its lower portion is made flexible by means of the joints $e\ e$, or some equivalent construction.

F is a compound or jointed lever, attached at one end to the block B, and at the other to the shaft H, on one end of which is placed the lever K, which is within easy reach of the driver.

At the centre of the shaft H is the wheel I, over which passes the chain M, which, at one end, is attached to the block B, close to the rake-head, and at the other passes around the windlass N, which is controlled by the ratchet and pawl $o$.

$b$ is an elastic cord, which takes up the slack of the chain M when the rake is about to revolve, and prevents it from being entangled in the teeth.

The operation of my invention is as follows:

When the rake-head is gliding along the ground in its usual position for gathering the hay, the foot D rests upon the tooth $t$, and prevents an accidental revolution, by reason of the front teeth catching in the ground, or meeting any other obstacle.

When the rake is full, and it is desirable to discharge the load, the driver lays hold of the lever K, and pulls it toward him. This causes the shaft H to perform a partial revolution, and by means of the jointed lever F, connected with said shaft, the block B is raised up. As it is raised, the screw-bar E is pushed up through the rectangular aperture, $a$, of the transverse bar L. This bar, E, is so made that, in passing through said aperture, it describes a quarter revolution, which removes the foot D from above the tooth $t$. At the same time, by means of the hook $c$, the said tooth $t$, and with it all the rear teeth of the rake, are raised up, and the front teeth catching in the ground, the rake revolves in the usual manner. After the revolution is complete, the driver pushes back the lever K, the block B falls, the hook $c$ resumes its position under the tooth $t$, the bar E performs a quarter revolution in the opposite direction, and the foot D is brought to its former position above the tooth $t$. In this manner, I have succeeded in obviating the principal objection to the former machines of this class, namely, their tendency to clog up and compel the driver to stop and get down to clear them.

As the head, A, is raised in the process of revolution, it is plain that the chain M will be slackened, and that, unless prevented, it would catch in the teeth.

To obviate this, I attach to the chain the cord $b$, the other end of which is fastened to the windlass, and is actuated by an India-rubber or other spring. This takes up the slack of the chain, and prevents entanglement.

When the driver desires to transport the rake from one place to another, he gives the windlass $n$ a few turns, this shortening the chain M, and raises the head of the rake from the ground, while the ratchet and pawl $o$ prevent the windlass from revolving in the opposite direction and unwinding the chain. This is more convenient and effectual than the old plan of raising the rake by means of a lever.

What I claim as my invention, and desire to secure by Letters Patent, is—

1. The screw or twisted bar E, with the foot D, substantially as described and set forth.

2. The said bar E and foot D, in combination with the transverse bar L and aperture $a$, substantially as herein specified.

3. The said bar E and foot D, in combination with the tooth, $t$, of the rake, substantially as specified.

4. The windlass N, in combination with the chain M and the head, A, of the rake, substantially as herein shown and specified.

5. The wheel I, in combination with the chain M and windlass N, substantially as specified herein.

6. The ratchet and pawl $o$, combined with the windlass N and chain M, substantially as herein set forth.

7. The cord $b$, attached to the chain M, substantially as and for the purposes herein specified and set forth.

In witness whereof, I have hereunto set my hand, this 9th day of July, 1868, in the presence of two witnesses, who have also set their names hereto in accordance with the statute in such case made and provided.

ELLIS LUTHER.

Witnesses:
  E. COWEN,
  JAMES FORSYTH.